Aug. 1, 1972  SHUZO OHE  3,681,203
METHOD AND AN APPARATUS FOR SEPARATION OF AZEOTROPIC
MIXTURES BY DISTILLATION USING SALT EFFECT
Filed Feb. 16 1970  4 Sheets-Sheet 1

INVENTOR
SHUZO OHE
BY Nolte and Nolte
ATTORNEYS

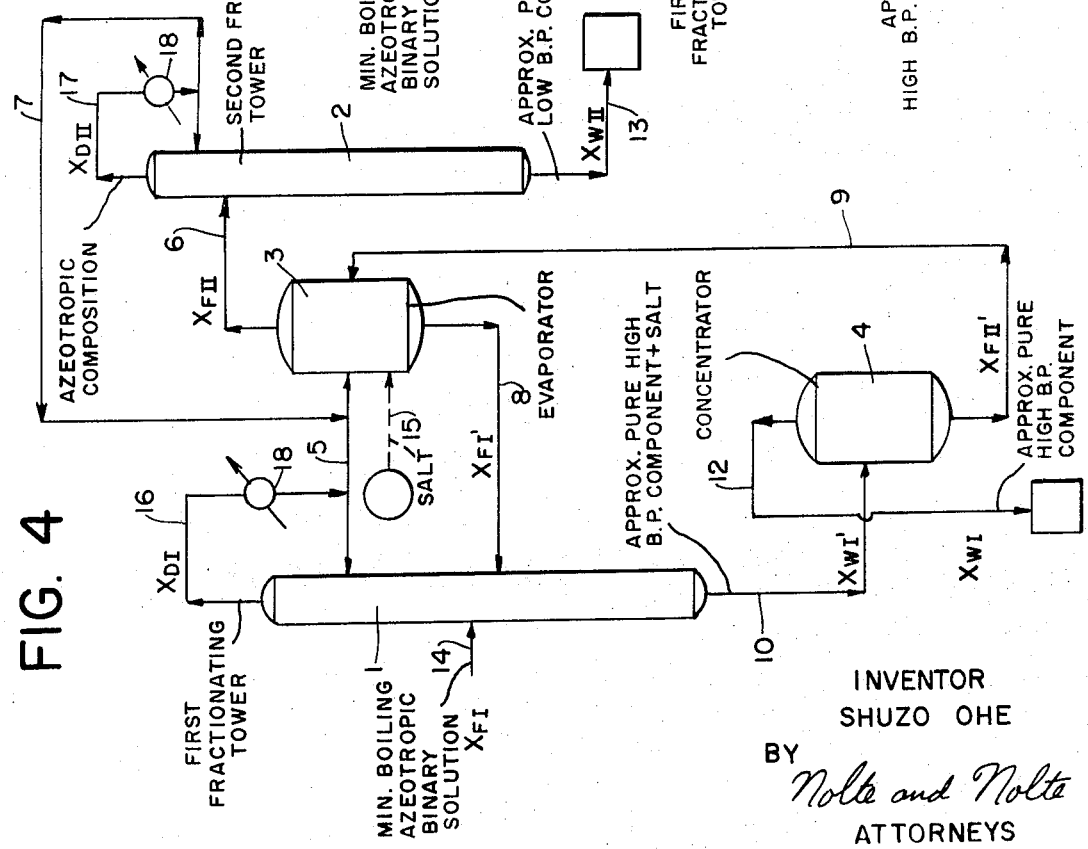

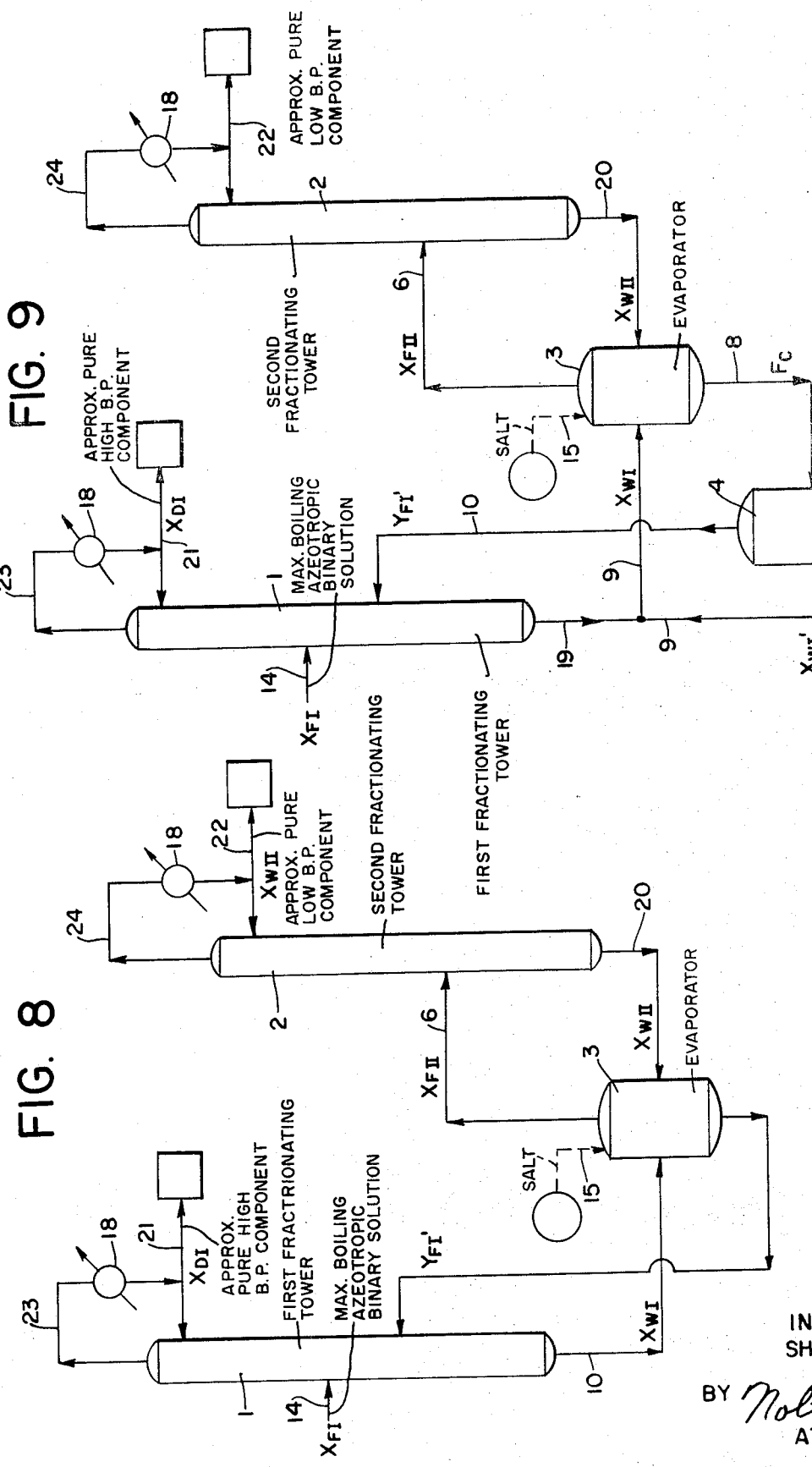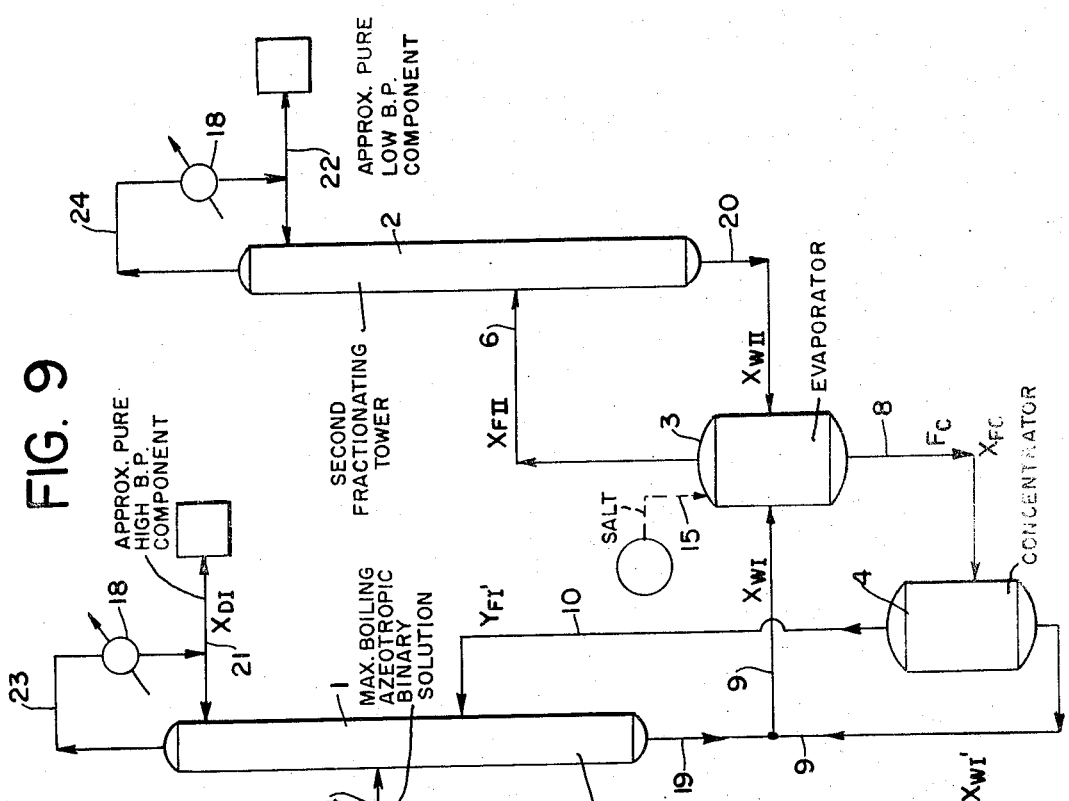

United States Patent Office 3,681,203
Patented Aug. 1, 1972

3,681,203
METHOD AND AN APPARATUS FOR SEPARATION OF AZEOTROPIC MIXTURES BY DISTILLATION USING SALT EFFECT
Shuzo Ohe, Yokohama, Japan, assignor to Ishikawajima-Harima Jukogyo Kabushiki Kaisha, Tokyo-to, Japan
Continuation-in-part of application Ser. No. 718,599, Apr. 3, 1968. This application Feb. 16, 1970, Ser. No. 11,647
Claims priority, application Japan, Apr. 7, 1967, 42/22,176
Int. Cl. B01d 3/34; C07c 29/26
U.S. Cl. 203—53   10 Claims

ABSTRACT OF THE DISCLOSURE

Azeotropic binary solutions are fractionated by means of an evaporator, and in some instances also a concentrator, in conjunction with two fractionating towers. The distillate or the bottom liquid from the first fractionating tower is fed to the evaporator to which is charged a salt which changes the relative volatilities of the solution components. Vapor generated in the evaporator is fed to the second fractionating tower. In the case of a minimum boiling azeotrope, the lower boiling component becomes the bottom liquid of the second fractionating tower and, thus, may be collected and the higher boiling component becomes the bottom liquid of the first fractionating tower or the bottom liquid of the first fractionating tower is a solution of the salt in the higher boiling component from which the higher boiling component may be separated by means of a concentrator. With a maximum boiling azeotrope, the higher and lower boiling components are collected as the distillates from the first and second fractionating towers, respectively.

This is a continuation-in-part of Ser. No. 718,599, filed Apr. 3, 1968, and now abandoned.

This invention relates to a method and apparatus for separating azeotropic mixtures. More particularly, this invention relates to a method and apparatus for separating azeotropic mixtures by the use of salts which change the boiling points of the components.

The following three methods have been used in the prior art for separating azeotropic mixtures by distillation: changing the operating pressure of the fractionating tower in which the azeotropic mixture is being distilled; decantation of the condensed vapor at the top of the fractionating tower into two liquids and subsequent individual fractionation of the respective liquids; and addition of a volatile third component to the azeotropic mixture to be distilled thereby to shift the composition of the azeotropic point.

The invention is more particularly hereinbelow described and compared with the prior art by reference to the drawings, in which:

FIGS. 4, 5 and 6 are flow sheets for preferred embodiments according to the invention.

In each of FIGS. 1 to 3 and 7, the $y_1$ and $x_1$ axes are the molar percentages of a given component of the system in the vapor and liquid phases, respectively, in equilibrium. The diagonal line represents the condition in which these molar percentages are equal. Should the curve intersect the diagonal line at any point intermediate its ends, that point of intersection represents an azeotrope. Regarding the method of separating an azeotropic mixture by distillation by changing the pressure in the fractionating tower, it is seen that the equilibrium curve is changed from that represented by a solid line to that represented by a broken line (FIG. 1) when the pressure in the fractionating tower is changed and, hence, the azeotropic point is eliminated, making possible the fractionation of the solution into its two components. However, this method has the following disadvantages: the fractionating tower and such related equipment as the condenser, reboiler and associated conduits must be made substantially gas and vapor impermeable in order that a sub-ambient or super-ambient pressure may be maintained therein; a compressor or vacuum pump is required depending upon whether the pressure in the system is to be super-ambient or sub-ambient, respectively; and adjustment of the pressure is required during operation.

Figure 1:
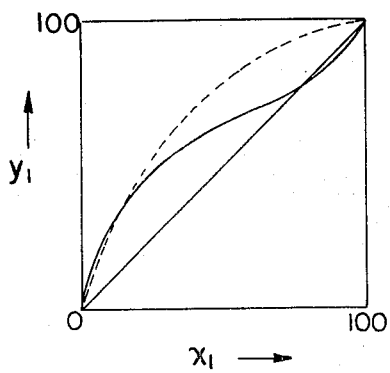
FIG. 1 is a vapor-liquid equilibrium diagram with reference to which there will hereinbelow be described the separation of an azeotropic mixture by distillation in which the pressure in the fractionating tower is changed.
Figure 2:
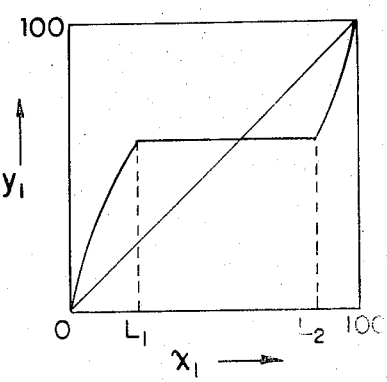
FIG. 2 is a vapor-liquid equilibrium diagram for an azeotropic system which forms two liquid phases and, hence, is subjected to separation by the prior art decantation method.

Regarding the prior art method which utilizes the decantation, in certain azeotropic systems the vapor in equilibrium with the liquid for any liquid composition within a certain range when condensed forms two liquid phases $L_1$ and $L_2$ (FIG. 2). The two phases may be separated from each other by decantation. The two solutions thus obtained are not themselves azeotropic and, accordingly, each may be conventionally fractionated into its components in a respective individual fractionating tower. This method, however, requires a relatively large amount of heat transfer because the condensate must be cooled approximately to ambient temperature in order most effectively to separate into two liquid phases. Further disadvantages of this technique are that the efficiency of the fractionating tower is reduced due to the incomplete mutual miscibility of the liquids therein and it is necessary to control the decanter.

Regarding the method concerning the addition of a volatile third component, sometimes known as an "entrainer," whereby the composition of the azeotropic point is shifted, this method, too, is usually encumbered with a decantation, hence involving the disadvantages involved in the last mentioned method. Further disadvantages are that a considerable amount of entrainer is required and additional heat energy is necessary to separate the entrainer from the primary components.

In the method and apparatus of the present invention, the aforementioned disadvantages are eliminated. To the azeotropic solution is added a relatively small quantity of salts soluble therein sufficient to change the relative volatilities of the components thereof so that vapor generated therefrom is of a composition other than the azeotropic composition. The condensed such vapor, not being of azeotropic composition, can be separated into its components by conventional distillation. Salt-containing solution is recycled and additional salt is supplied to the system to make up for any loss thereof.

Exemplary of the invention is the addition of calcium chloride, potassium acetate or calcium bromide to the isopropanol-water azeotropic system, the addition of calcium chloride to the ethanol-water, ethyl acetate-ethanol, methyl acetate-methanol or hydrogen chloride-water azeotropic system, the addition of calcium bromide to the acetone-methanol azeotropic system, the addition of magnesium chloride to the formic acid-water azeotropic system and the addition of magnesium nitrate to the nitric acid-water azeotropic system. The only requirement of the salt is that it dissolve and, hence, ionize in the particular azeotropic solution in question whereupon it modifies the relative volatilities of the components thereof.

The invention will now be further described by reference to certain particular preferred embodiments thereof.

The apparatus illustrated in FIG. 4 is suitable for separating according to the invention an azeotropic solution having a minimum boiling point.

The system of FIG. 4 comprises a fractionating tower 1 to which is fed through a conduit 14 a solution which upon distillation will form a minimum boiling azeotrope, such as an equimolar isopranol-water solution. The composition of this feed is designated $X_{FI}$. The fractionating tower 1 is heated. Vapor thus generated leaves the fractionating tower through conduit 16 which communicates with the top of the fractionating tower $X_{DI}$, the composition of the distillate, is the azeotropic composition. Conduit 16 communicates with a conduit 5 and conduit 5, in turn, communicates at one end with the upper portion of the fractionating tower 1 and at the other end with an evaporator 3. A portion of the condensed distillate may, therefore, be recycled to the fractionating tower 1. All or the balance of the condensed distillate is fed through the conduit 5 to the evaporator 3. A quantity of calcium chloride is initially charged to the evaporator 3. The evaporator 3 is heated whereby vapor is generated and removed from the evaporator 3 by means of a conduit 6 communicating with the top thereof. Due to the presence of the calcium chloride, the composition of the vapor generated is different from the azeotropic composition of the system. This composition is designated $X_{FII}$. The conduit 6 communicates with a second fractionating tower 2 intermediate the ends thereof and thereby the vapor of composition $X_{FII}$ is fed to the fractionating tower 2. The isopropanol-water-calcium chloride solution of composition $X_{FI'}$ at the bottom of the evaporator 3 is fed through a conduit 8 to the stripping zone of the fractionating tower 1. After start-up, the composition being distilled in fractionating tower 1 is isopropanol-water-calcium chloride rather than merely isopropanol-water.

The bottom liquid from the fractionating tower 2 is removed from the fractionating tower 2 through a conduit 13 and is of a composition $X_{WII}$ which is approximately pure isopropanol. The vapor generated in the fractionating tower 2 is removed from the top thereof by means of conduit 17 and the composition thereof $X_{DII}$ is the azeotropic composition. This vapor is condensed by means of a condenser 18 and a portion of the resultant distillate may be recycled to the fractionating tower 2. The balance of the distillate is cycled to the evaporator 3 by means of a conduit 7 which communicates with conduit 5.

The bottom liquid of the fractionating tower 1, of composition $X_{WI}$, which is approximately pure water with calcium chloride dissolved therein, is cycled by means of conduit 10 to a concentrator 4. Heat is supplied to the concentrator 4 and the vapor thus generated, which is approximately pure water, is removed by means of a conduit 12 and collected. The bottom liquid, which is of a composition $X_{FII}$, representing approximately pure water with a greater concentration of calcium chloride dissolved therein than in $X_{WI}$, is cycled by means of a conduit 9 to the evaporator 3.

If sufficient salt is charged to the evaporator 3 at the beginning of the process, normally it will not be necessary to introduce salt during the process. However, if it is desired to introduce salt during the process, this may be done by means of a conduit 15 communicating with the evaporator 3.

The following is a specific operating example employing the apparatus of FIG. 4.

| Stream | Moles/hr. | Mole percent isopropanol | Mole percent water | Weight percent CaCl$_2$ |
|---|---|---|---|---|
| $X_{FI}$ | 100 | 50 | 50 | |
| $X_{DI}$ | 138 | 69.0 | 31.0 | |
| $X_{WI'}$ | 113 | 0.1 | 99.9 | 54.0 |
| $X_{ZI}$ | 50 | 0.1 | 99.9 | |
| $X_{FII'}$ | 50 | 0.1 | 99.9 | 70.0 |
| $X_{FII}$ | 81.8 | 88.0 | 12.0 | |
| $X_{FI'}$ | 151 | 30.0 | 70.0 | 36.5 |
| $X_{WII}$ | 50 | 99.9 | 0.1 | |
| $X_{DII}$ | 31 | 69.0 | 31.0 | |

It is also be noted that in this operating example there is no recycle of $X_{DI}$ directly to the fractionating tower 1. Also, temperatures involved are as follows: at the bottom of the fractionating tower 1, 110° C.; at the top of the fractionating tower 1, 80.5° C.; at the bottom of the concentrator 4, 120° C.; at the bottom of the evaporator 3, 83.7° C.; in the conduit 6, 81° C.; at the bottom of the fractionating tower 2, 81.5° C.; at the top of the fractionating tower 2, 80.5° C.

Figure 6:
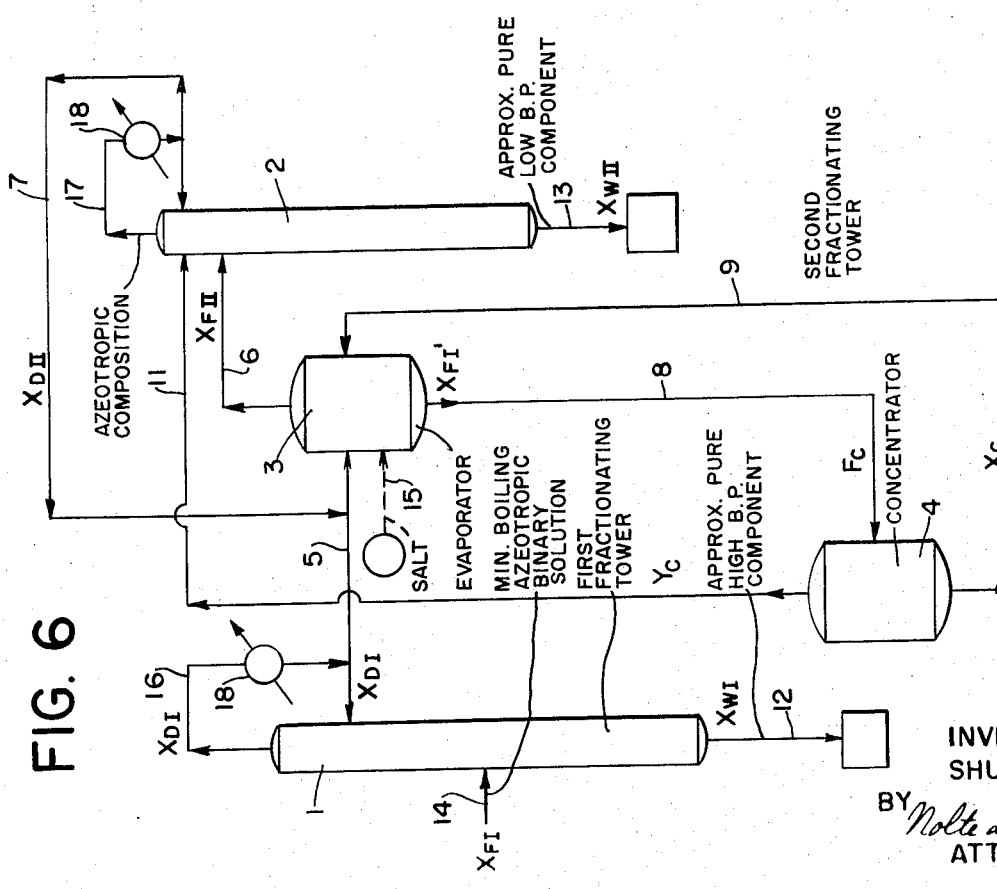

In FIGS. 5 and 6 are illustrated variants for the separation according to the invention of solutions which form minimum boiling azeotropes.

The arrangements of FIGS. 5 and 6 differ from that of FIG. 4 in that the conduit 8 from the bottom of the evaporator 3 communciates with the concentrator 4 rather than the fractionating tower 1 and the bottom liquid $X_{FI'}$ from the evaporator 3, accordingly, constitutes the feed $F_C$ to the concentrator 4. Moreover, in both FIGS. 5 and 6 the essentially pure water stream $X_{WI}$ is collected from the bottom of the fractionating tower 1 rather than from the top the concentrator 4. In the arrangement of FIG. 5, the vapor $Y_C$ from the top of the concentrator 4 is fed by means of a conduit 10' to the stripping section of the fractionating tower 1 whereas in the arrangement of FIG. 6 the stream $Y_C$ is fed by means of a conduit 11 to the enriching section of the fractionating tower 2. The arrangement of FIG. 5 is employed when $Y_C$ contains a greater proportion of higher boiling component than the azeotropic composition and the arrangement of FIG. 6 is employed when $Y_C$ contains a lower proportion of the higher boiling component than the azeotropic composition.

Figure 3:
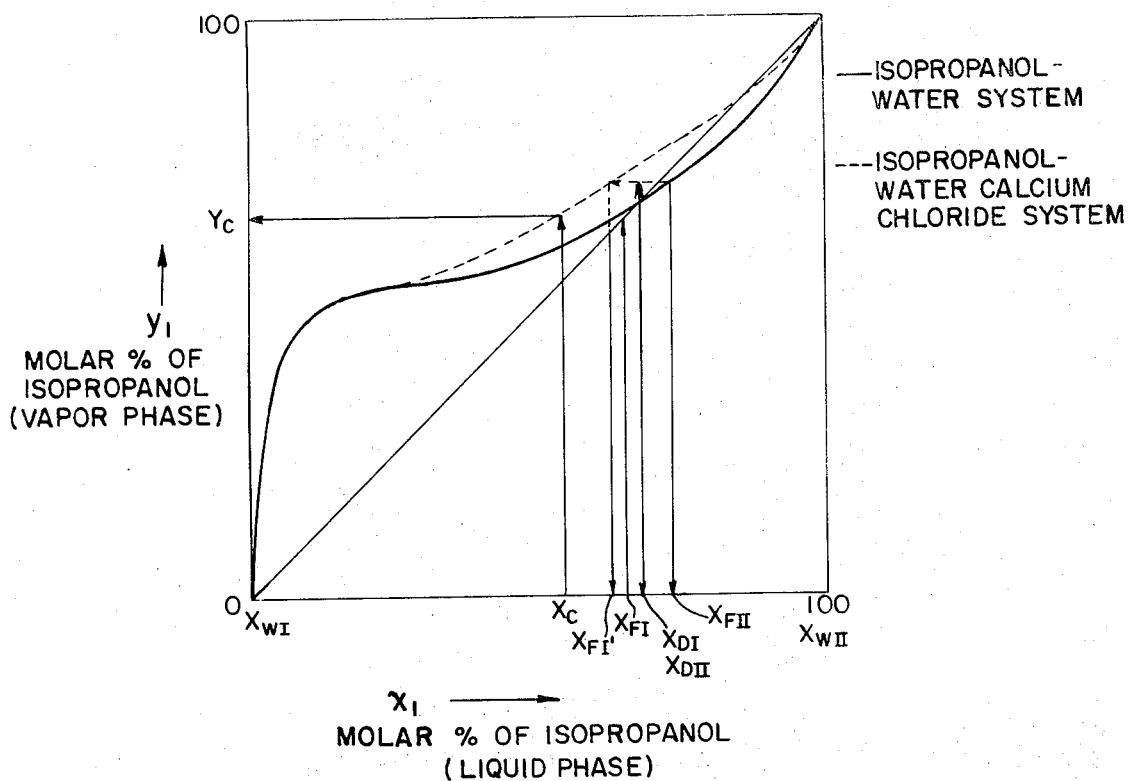
FIG. 3 is a vapor-liquid equilibrium diagram for the system isopropanol-water-calcium chloride and relates to the methods of the present invention as applied to an azeotropic mixture having a minimum boiling point.

FIG. 3 illustrates the processes of FIGS. 4, 5 and 6 by way of a liquid-vapor equilibrium diagram.

An operating example employing the arrangement of FIG. 5 is as follows:

| Stream | Moles/hr. | Mole percent isopropanol | Mole percent water | Weight percent CaCl$_2$ |
|---|---|---|---|---|
| $X_{FI}$ | 638 | 51.9 | 48.1 | |
| $X_{DI}$ | 644 | 69.0 | 31.0 | |
| $X_{WI}$ | 307 | 0.1 | 99.9 | |
| $X_{FI'}(F_C)$ | 1,565 | 15 | 85 | 44 |
| $X_C$ | 1,252 | 10.0 | 90.0 | 53 |
| $Y_C$ | 313 | 50 | 50 | |
| $X_{FII}$ | 1,565 | 85 | 15 | |
| $X_{DII}$ | 1,234 | 81 | 19 | |
| $X_{WII}$ | 331 | 99.9 | 0.1 | |

The operating temperatures in this example are as follows: bottom of fractionating tower 1, 100° C.; top of fractionating tower 1, 80.5° C.; bottom of the evaporator 3, 83° C.; bottom of the concentrator 4, 84° C.; bottom of the distillation tower 2, 81.5° C.; top of the distillation tower 2, 80.5° C.

FIG. 8 represents an arrangement according to the invention for processing a solution which forms a maximum boiling azeotrope. The description set forth hereinabove with respect to FIG. 4 is applicable with the following exceptions. In FIG. 4, the salt recycle is as follows: evaporator 3 to stripping section of first fractionating tower 1 to concentrator 4 to evaporator 3. In the arrangement of FIG. 8, the recycle of salt is as follows: evaporator 3 to stripping section of first fractionating tower 1 to evaporator 3. It is seen that in the arrangement of FIG. 8 the concentrator 4 of FIG. 4 is eliminated. In FIG. 8 the conduits which carry away the vapor and the resultant distillate from the fractionating tower 1 are designated 23 and 21 and the corresponding conduits for fractionating tower 2 are designated 24 and 22; also, the conduit through which the bottom liquid from the fractionating tower 2 is fed to the evaporator 3 is designated 20.

The arrangement of FIG. 9 is also for processing according to the invention a solution having a maximum boiling azeotrope. This arrangement differs from that of FIG. 8 in the following respects. A concentrator 4 is provided which receives bottom liquid through conduit 8 from the evaporator 3. The vapor from the concentrator 4 is cycled to the fractionating tower 1 by means of a conduit 10 and the bottom liquid from the concentrator 4 is cycled by means of conduit 9 to the evaporator 3.

Figure 7:
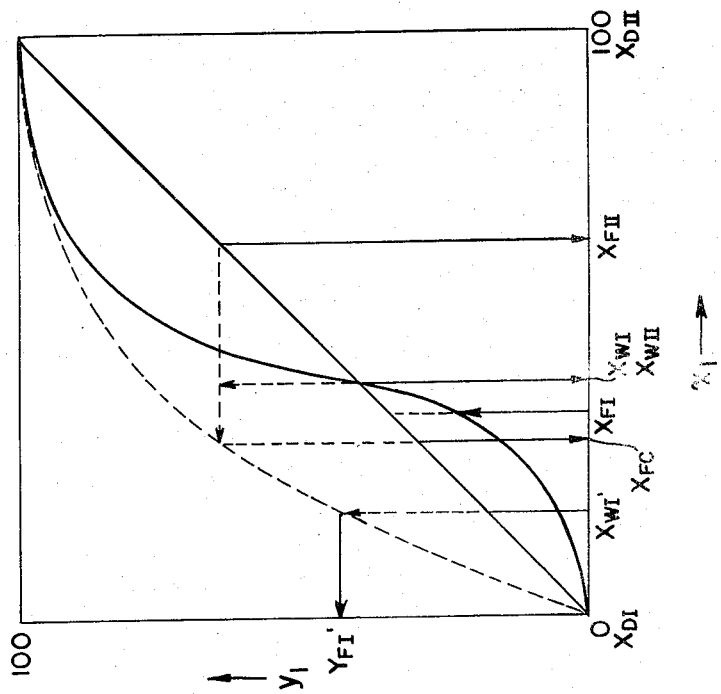

FIG. 7 is a vapor-liquid equilibrium diagram representing the process carried out in the arrangement of FIG. 8 or that of FIG. 9. It should be apparent that in the arrangements of FIGS. 8 and 9, the distillate collected from the first column is approximately pure higher boiling component and the distillate collected from the second column is approximately pure lower boiling component.

I claim:

1. A method for separating a minimum boiling azeotropic binary solution into its components, comprising distilling the initial solution in a first distillation zone to form a vapor and a bottom liquid, the first distillation zone comprising a stripping section, withdrawing the vapor from the distillation zone and condensing it to form a distillate, withdrawing the bottom liquid from the distillation zone, feeding the distillate to an evaporating zone, charging a salt to the evaporating zone, the salt being soluble in the binary solution in the evaporating zone, recirculating the salt in a cycle including the evaporating zone, generating vapor from the salt-containing binary solution in the evaporating zone, the vapor from the salt-containing binary solution having a concentration of the lower boiling component greater than the concentration thereof in said initial solution, feeding the bottom liquid from the evaporating zone to the stripping section of the first distillation zone, feeding the vapor from the binary solution to a second distillation zone, forming a vapor and a bottom liquid in the second distillation zone and withdrawing the vapor and the bottom liquid from the second distillation zone, feeding the vapor from the second distillation zone to the evaporating zone, feeding the bottom liquid from the first distillation zone to a concentrating zone, generating vapor from the liquid in the concentrating zone, feeding the bottom liquid from the concentrating zone to the evaporating zone, withdrawing the vapor generated in the concentrating zone, the vapor generated in the concentrating zone consisting of approximately pure high boiling component of the binary solution, and withdrawing the bottom liquid from the second distillation zone, the bottom liquid from the second distillation zone consisting of approximately pure low boiling component of the binary solution.

2. A method for separating a minimum boiling azeotropic binary solution into its components, comprising distilling the initial solution in a first distillation zone to form a vapor and a bottom liquid, the first distillation zone comprising a stripping section, withdrawing the vapor from the distillation zone and condensing it to form a distillate, withdrawing the bottom liquid from the distillation zone, feeding the distillate to an evaporating zone, charging a salt to the evaporating zone, the salt being soluble in the binary solution in the evaporating zone, recirculating the salt in a cycle including the evaporating zone, generating vapor from the salt-containing binary solution in the evaporating zone, the vapor from the salt-containing binary solution having a concentration of the lower boiling component greater than the concentration thereof in said initial solution, feeding the bottom liquid from the evaporating zone to a concentrating zone, generating in the concentrating zone vapor containing more high boiling component than the azeotrope and feeding the vapor from the concentrating zone to said stripping section, feeding the vapor from the binary solution to a second distillation zone, forming a vapor and a bottom liquid in the second distillation zone and withdrawing the vapor and the bottom liquid from the second distillation zone, feeding the bottom liquid from the second distillation zone to the evaporating zone, feeding the vapor from the second distillation zone to the evaporating zone, withdrawing the bottom liquid from the first distillation zone, the bottom liquid from the first distillation zone consisting of approximately pure high boiling component of the binary solution, and withdrawing the bottom liquid from the second distillation zone, the bottom liquid from the second distillation zone consisting of approximately pure low boiling component.

3. A method for separating a minimum boiling azeotropic binary solution into its components, comprising distilling the initial solution in a first distillation zone to form a vapor and a bottom liquid, feeding the bottom liquid from the evaporating zone to a concentrating zone, withdrawing the vapor from the distillation zone and condensing it to form a distillate, withdrawing the bottom liquid from the distillation zone, feeding the distillate to an evaporating zone, charging a salt to the evaporating zone, the salt being soluble in the binary solution in the evaporating zone, recirculating the salt in a cycle including the evaporating zone, generating vapor from the salt-containing binary solution in the evaporating zone, the vapor from the salt-containing binary solution having a concentration of the lower boiling component greater than the concentration thereof in said initial solution, feeding the vapor from the binary solution to a second distillation zone, generating in the concentrating zone vapor containing less high boiling component than the azeotrope and feeding the vapor to the second distillation zone, forming a vapor and a bottom liquid in the second distillation zone and withdrawing the vapor and the bottom liquid from the second distillation zone, feeding the bottom liquid from the concentrating zone to the evaporating zone, the feeding the vapor from the second distillation zone to the evaporating zone, withdrawing the bottom liquid from the first distillation zone, the bottom liquid from the first distillation zone consisting of approximately pure high boiling component of the binary solution, and withdrawing the bottom liquid from the second distillation zone, the bottom liquid from the second distillation zone consisting of approximately pure low boiling component.

4. A method for separating a maximum boiling azeotropic binary solution into its components, comprising distilling the initial solution in a first distillation zone to form a vapor and a bottom liquid, the first distillation zone comprising a stripping section, withdrawing the vapor from the distillation zone and condensing it to form a distillate, withdrawing the bottom liquid from the distillation zone, feeding the bottom liquid to an evaporating zone, charging a salt to the evaporating zone, the salt being soluble in the binary solution in the evaporating zone, recirculating the salt in a cycle including the evaporating zone, generating vapor from the salt-containing binary solution in the evaporating zone, the vapor from the salt-containing binary solution having a concentration of the lower boiling component greater than the concentration thereof in said initial solution, feeding the vapor from the binary solution to a second distillation zone, forming a vapor and a bottom liquid in the second distillation zone, feeding the bottom liquid from the evaporating zone to said stripping section, feeding the bottom liquid from the second distillation zone to the evaporating zone, withdrawing and condensing the vapor from the first distillation zone, the resultant distillate consisting of approximately pure high boiling component, and withdrawing and condensing the vapor from the second distillation zone, the resultant distillate consisting of approximately pure low boiling component.

5. A method for separating a maximum boiling azeotropic binary solution into its components, comprising distilling the initial solution in a first distillation zone to form a vapor and a bottom liquid, the first distillation zone comprising a strippiing section, withdrawing the vapor from the distillation zone and condensing it to form a distillate, withdrawing the bottom liquid from the distillation zone, feeding the bottom liquid to an evaporating zone, charging a salt to the evaporating zone, the salt being soluble in the binary solution in the evaporating zone, recirculating the salt in a cycle including the evaporating zone, generating vapor from the salt-containing binary solution in the evaporating zone, the vapor from the salt-containing binary solution having a concentration of the lower boiling component greater than the concentration thereof in said initial solution, feeding the vapor from the binary solution to a second distillation zone, forming a vapor and a bottom liquid in the second distillation zone, feeding the bottom liquid from the second distillation zone to the evaporating zone, feeding the bottom liquid from the evaporating zone to a concentrating zone, generating vapor in the concentrating zone and feeding the vapor to said stripping section, feeding the bottom liquid from the concentrating zone to the evaporating zone, withdrawing and condensing the vapor from the first distillation zone, the resultant distillate consisting of approximately pure high boiling component, and withdrawing and condensing the vapor from the second distillation zone, the resultant distillate consisting of approximately pure low boiling component.

6. Apparatus for separating a minimum boiling azeotropic binary solution into its components, comprising means defining a first distillation zone, means for feeding the initial solution to the distillation zone, means for withdrawing vapor generated in the distillation zone from the distillation zone and condensing it to form a distillate, means for withdrawing bottom liquid from the distillation zone, means defining an evaporating zone, means for feeding the distillate to the evaporating zone, means for charging a salt to the evaporating zone, means including the evaporating zone defining a circuit for recirculation of the salt, means defining a second distillation zone, means for feeding vapor generated in the evaporating zone at a concentration of the lower boiling component greater than the concentration thereof in the initial solution to the second distillation zone, means for withdrawing from the second distillation zone the vapor and the bottom liquid therein, a stripping section in the first distillation zone, means for feeding the bottom liquid from the evaporating zone to the stripping section of the first distillation zone, means for feeding the vapor from the second distillation zone to the means defining an evaporating zone, means for feeding the bottom liquid from the first distillation zone to the concentrating zone, means for feeding the bottom liquid from the concentrating zone to the evaporating zone, means for withdrawing vapor generated in the concentrating zone therefrom and means for withdrawing the bottom liquid from the second distillation zone.

7. Apparatus for separating a minimum boiling azeotropic binary solution into its components, comprising means defining a first distillation zone, means for feeding the initial solution to the distillation zone, means for withdrawing vapor generated in the distillation zone from the distillation zone and condensing it to form a distillate, means for withdrawing bottom liquid from the distillation zone, means defining an evaporating zone, means for feeding the distillate to the evaporating zone, means for charging a salt to the evaporating zone, means including the evaporating zone defining a circuit for recirculation of the salt, means defining a second distillation zone, means for feeding vapor generated in the evaporating zone at a concentration of the lower boiling component greater than the concentration thereof in the initial solution to the second distillation zone, means for withdrawing from the second distillation zone the vapor and the bottom liquid therein, a stripping section in the first distillation zone, means for feeding the bottom liquid from the evaporating zone to a concentrating zone, means for feeding vapor in the concentrating zone to the stripping section, means for feeding the bottom liquid from the concentrating zone to the evaporating zone, means for feeding the vapor from the second distillation zone to the evaporating zone, means for withdrawing the bottom liquid from the first distillation zone and means for withdrawing the bottom liquid from the second distillation zone.

8. Apparatus for separating a minimum boiling azeotropic binary solution into its components, comprising means defining a first distillation zone, means for feeding the initial solution to the distillation zone, means for withdrawing vapor generated in the distillation zone from the distillation zone and condensing it to form a distillate, means for withdrawing bottom liquid from the distillation zone, means defining an evaporating zone, means for feeding the distillate to the evaporating zone, means for charging a salt to the evaporating zone, means including the evaporating zone defining a circut for recirculation of the salt, means defining a second distillation zone, means for feeding vapor generated in the evaporating zone at a concentration of the lower boiling component greater than the concentration thereof in the initial solution to the second distillation zone, means for withdrawing from the second distillation zone the vapor and the bottom liquid therein, means defining a concentrating zone, means for feeding the bottom liquid from the evaporating zone to the concentrating zone, means for feeding the bottom liquid from the concentrating zone to the evaporating zone, means for feeding the vapor from the second distillation zone to the evaporating zone, means for withdrawing the bottom liquid from the first distillation zone and means for withdrawing the bottom liquid from the second distillation zone.

9. Apparatus for separating a maximum boiling azeotropic binary solution into its components, comprising means defining a first distillation zone, means for feeding the initial solution to the distillation zone, means for withdrawing vapor generated in the distillation zone from the distillation zone and condensing it to form a distillate, means for withdrawing bottom liquid from the distillation zone, means defining an evaporating zone, means for feeding the distillate to the evaporating zone, means for charging a salt to the evaporating zone, means including the evaporating zone defining a circuit for recirculation of the salt, means defining a second distillation zone, means for feeding vapor generated in the evaporating zone at a concentration of the lower boiling component greater than the concentration thereof in the initial solution to the second distillation zone, means for withdrawing from the second distillation zone the vapor and the bottom liquid therein, a stripping section in the first distillation zone, means for feeding the bottom liquid from the evaporating zone to the stripping section, means for feeding the bottom liquid from the second distillation zone to the evaporating zone, means for withdrawing and condensing the vapor from the first distillation zone and means for withdrawing and condensing vapor from the second distillation zone.

10. Apparatus for separating a maximum boiling azeotropic binary solution into its components, comprising means defining a first distillation zone, means for feeding the initial solution to the distillation zone, means for withdrawing vapor generated in the distillation zone from the distillation zone and condensing it to form a distillate, means for withdrawing bottom liquid from the distillation zone, means defining an evaporating zone, means for feeding the distillate to the evaporating zone, means for charging a salt to the evaporating zone, means including the evaporating zone defining a circuit for recirculation of the salt, means defining a second distillation zone, means for feeding vapor generated in the evaporating zone at a concentration of the lower boiling component greater than the concentration thereof in the initial solution to the second distillation zone, means for withdrawing from the second distillation zone the vapor and the bottom liquid therein, means for feeding the bottom liquid from the second distillation zone to the evaporating zone, means defining a concentrating zone, means for feeding the bottom liquid from the evaporating zone to the concentrating zone, means for feeding vapor generated in the concentrating zone to the first distillation zone, a stripping section in the first distillation zone and the vapor feeding means from the concentrating zone communicating with said stripping section, means for feeding the bottom liquid from the concentrating zone to the evaporating zone, means for withdrawing and condensing vapor from the first distillation zone and means for withdrawing vapor from the second distillation zone.

References Cited

UNITED STATES PATENTS

| | | | |
|---|---|---|---|
| 2,081,189 | 5/1937 | Wiezevich | 203—18 |
| Re25,393 | 6/1963 | Bechtel | 203—12 |
| 2,308,170 | 1/1943 | Green et al. | 203—18 |
| 2,463,453 | 3/1949 | Beardsley | 203—13 |
| 2,612,468 | 9/1952 | Morrell et al. | 203—96 |
| 2,733,195 | 1/1956 | Miller | 202—154 |
| 2,749,291 | 6/1956 | Pierotti et al. | 202—154 |
| 2,788,315 | 4/1957 | Morrell et al. | 203—53 |
| 3,106,515 | 10/1963 | Williams | 203—15 |
| 3,433,718 | 3/1969 | Yodis | 203—13 |
| 3,530,043 | 9/1970 | Horn et al. | 202—155 |

WILBUR L. BASCOMB, Jr., Primary Examiner

U.S. Cl. X.R.

203—18, 82, 84; 202—154, 155, 173; 260—643 R, 643 F